US007698573B2

(12) United States Patent
Yamato et al.

(10) Patent No.: US 7,698,573 B2
(45) Date of Patent: Apr. 13, 2010

(54) POWER SOURCE APPARATUS FOR DISPLAY AND IMAGE DISPLAY APPARATUS

(75) Inventors: Asahi Yamato, Yokohama (JP); Toshihiro Yanagi, Nara (JP)

(73) Assignee: Sharp Corporation, Osaka (JP)

( * ) Notice: Subject to any disclaimer, the term of this patent is extended or adjusted under 35 U.S.C. 154(b) by 498 days.

(21) Appl. No.: 10/397,236

(22) Filed: Mar. 27, 2003

(65) Prior Publication Data

US 2003/0184538 A1 Oct. 2, 2003

(30) Foreign Application Priority Data

Apr. 2, 2002 (JP) ............................ 2002-100662

(51) Int. Cl.
*G06F 1/26* (2006.01)
*G06F 1/32* (2006.01)

(52) U.S. Cl. ........................ 713/300; 713/320; 345/52; 345/211

(58) Field of Classification Search ................. 713/300, 713/320; 345/52, 211
See application file for complete search history.

(56) References Cited

U.S. PATENT DOCUMENTS

| | | | | |
|---|---|---|---|---|
| 5,682,083 | A * | 10/1997 | Shin | 315/1 |
| 6,144,357 | A * | 11/2000 | Jeong | 345/100 |
| 6,204,616 | B1 * | 3/2001 | Yamamoto | 315/411 |
| 6,297,601 | B1 * | 10/2001 | Kang | 315/387 |
| 6,462,725 | B1 * | 10/2002 | Orisaka | 345/98 |
| 6,762,737 | B2 * | 7/2004 | Kajihara et al. | 345/89 |

FOREIGN PATENT DOCUMENTS

| | | |
|---|---|---|
| JP | 61-162029 | 7/1986 |
| JP | 06-160806 | 6/1994 |
| JP | 09-311311 | 12/1997 |
| JP | 11-219147 | 8/1999 |
| JP | 2000-214830 | 8/2000 |
| JP | 2001-249320 | 9/2001 |

OTHER PUBLICATIONS

Japanese Office Action dated Mar. 10, 2009.

* cited by examiner

*Primary Examiner*—Thomas Lee
*Assistant Examiner*—Michael J Brown
(74) *Attorney, Agent, or Firm*—Harness, Dickey & Pierce, P.L.C.

(57) ABSTRACT

A power source apparatus for a display is provided, which comprises a voltage generating section capable of controlling outputting or output termination of one or more predetermined output voltages, and a switching section provided between an output terminal of the predetermined output voltage and a predetermined reference potential terminal. The switch section is turned from OFF to ON when the voltage generating section performs the output termination control.

10 Claims, 17 Drawing Sheets

Prior art

Prior art

*Prior art*

*Prior art*

*Prior art*

*Prior art*

POWER SOURCE APPARATUS FOR DISPLAY AND IMAGE DISPLAY APPARATUS

BACKGROUND OF THE INVENTION

1. Field of the Invention

The present invention relates to a power source apparatus for a display for generating and supplying a predetermined voltage to each section, and an image display apparatus incorporating the same (e.g., a liquid crystal display apparatus and the like).

2. Description of the Related Art

Conventionally, a liquid crystal display apparatus is provided with a display panel comprising a display section. The display section has a plurality of pixels arranged in a matrix. Each pixel is provided with a thin film transistor (TFT). A display signal is applied between the pixel electrode and the common electrode (counter electrode) of each pixel to perform image displaying. Typically, the TFT is formed of a MOSFET having a source electrode, a drain electrode and a gate electrode. The drain electrode of the TFT is connected to the pixel electrode of the pixel. The source electrode of the TFT is connected to a source bus line (source line) on which a display signal is transferred. The gate electrode of the TFT is connected to a gate bus line (gate line) on which a TFT drive voltage is transferred.

FIG. 8 is a block diagram showing a configuration of a conventional liquid crystal display apparatus.

Referring to FIG. 8, a liquid crystal display apparatus 100 comprises a display controller 110, a power source circuit 120 (power source apparatus for a display), and a display panel 130 having a display section 130*a*.

The display controller 110 receives I/O (Input/Output) signals output from an external system controller 200 and outputs various signals, such as display data (display signals), to the display panel 130.

The power source circuit 120 outputs a source reference voltage to the source electrode (pixel electrode) of the TFT of each pixel in the display panel 130 through a corresponding output terminal thereof. The power source circuit 120 also outputs a common reference voltage to the common electrode of the TFT of each pixel and outputs a gate HIGH voltage and a gate LOW voltage to the gate electrode of the TFT.

The display panel 130 further comprises a gate driver 130*b* for driving a plurality of gate lines GL and a source driver 130*c* for driving a plurality of source lines SL. In the display section 130*a*, a plurality of pixels are arranged in a matrix such that each pixel is located in the vicinity of the intersection of the gate line GL and the source line SL and the pixel is connected via a TFT to the gate line GL and the source line SL. The display panel 130 receives various signals (e.g., display data and the like) output from the display controller 110 and the above-described predetermined output voltage output from the power source circuit 120, and performs image displaying on the display section 130*a* via the gate driver 130*b* and the source driver 130*c*.

FIG. 9 is a timing chart of signal voltages applied to the display panel of the liquid crystal display apparatus of FIG. 8.

A pixel voltage, a common voltage and a source voltage as shown in FIG. 9 are applied to each pixel. The pixel voltage is a voltage synthesized based on the difference between the source voltage and the common voltage, which is an alternating voltage having a pulse form. A gate voltage is applied to select pixels on a line (Nth line; N is a natural number) in the display panel 130 at predetermined time intervals.

The source/common reference voltage, the gate HIGH voltage and the gate LOW voltage are constant whenever applied to the display panel 130 for driving.

In the liquid crystal display apparatus 100 of FIG. 8, electric charges often remain in the pixel electrode (and the common electrode) of each pixel in the display panel 130 even after the source/common reference voltage, the gate HIGH voltage and the gate LOW voltage of the power source circuit 120 are turned OFF, as shown with arrow A in FIG. 9. The electric charges cannot be erased in a short time. Therefore, it is likely that an image displayed on the display section 130*a* of the liquid crystal display apparatus 100 persists after turning OFF the power source (such a persisting image is herein referred to as an afterimage).

The afterimage occurring on the display screen of the display section 130*a* in the display panel 130 will be described with reference to FIGS. 10A and 10B. FIG. 10A shows the fall and rise of the pixel voltage immediately after the source/common reference voltage, the gate HIGH voltage and the gate LOW voltage of the power source circuit 120 are turned OFF. FIG. 10B shows an afterimage on the display section 130*a* of the display panel 130 in association with the pixel voltage of FIG. 10A.

As shown in FIG. 10A, the fall and rise of the source/common reference voltage supplied to the display panel 130 are gradually transitioned. Therefore, an afterimage occurs as show in FIG. 10B during a time for which electric charges are not sufficiently removed from pixels.

In the case of applications where the liquid crystal display apparatus 100 is employed in the display section of a portable apparatus, such as a mobile telephone or the like, a battery is used to drive the apparatus and low power consumption is thus required. For this reason, the liquid crystal display apparatus 100 has to be driven using a low frequency. In this case, the pixels of the display panel 130 in the liquid crystal display apparatus 100 are designed to have a high level of ability to retain electric charges in order to display images using display signals. This ability makes the above-described afterimage problem more noticeable.

In order to solve the afterimage problem, for example, a discharge circuit for removing unnecessary electric charges has been reported (see FIG. 11, for example).

In a discharge circuit shown in FIG. 11, a power source circuit 120 includes a booster circuit 140 which generates a source/common reference voltage, a gate HIGH voltage and a gate LOW voltage. These voltages are output as output voltages from the power source circuit 120 to a display panel 130. An output line is connected between an output terminal of the booster circuit 140 and an input terminal of the display panel 130. A discharge resistor R and a capacitor C are connected in parallel between the output line and GND (the earth). The booster circuit 140 generates a predetermined source/common reference voltage, gate HIGH voltage or gate LOW voltage based on an externally input voltage.

The above-described discharge circuit (a parallel circuit of the discharge resistor R and the capacitor C) discharges unnecessary electric charges remaining in each pixel in the display panel 130 to GND (the earth) when the source/common reference voltage, the gate HIGH voltage and the gate LOW voltage are in the OFF state in the power source circuit 120. Thereby, the afterimage on the display screen can be prevented.

Japanese Laid-Open Publication No. 61-162029 discloses a liquid crystal drive circuit (see FIG. 13), in which in order to prevent display abnormality due to the gradual decrease of the waveform of a voltage applied to a display panel LCD after turning OFF the power source, a circuit 200 is provided for extinguishing the voltage applied to the display panel LCD before the voltage of the power source line starts decreasing. In this liquid crystal drive circuit, a direct current power source DC is connected via a diode D and a power source switch SW to a power source terminal A of a liquid crystal driver DR, and a capacitor C is connected between the power source terminal A of the liquid crystal driver DR and the earth GND. When the power source switch SW is opened to interrupt the connection between the direct current power source DC and the liquid crystal driver DR, a voltage drop at the power source terminal A of the liquid crystal driver DR is delayed due to discharge of the capacitor C. This is because a current is prevented by the diode D from flowing from the capacitor C to the terminal A'. Therefore, the signal voltage of the signal terminal A' drops earlier than the voltage of the power source terminal A. Therefore, the voltage applied to the display panel LCD becomes 0 V before the voltage drop of the power source line connected to the power source terminal A of the liquid crystal driver DR.

Japanese Laid-Open Publication No. 6-160806 discloses another liquid crystal display apparatus. When a power source switch is turned ON or off, streak display defects appear on the screen. To avoid this problem, the liquid crystal display apparatus is provided with a scanning continuation circuit. A scanning electrode drive circuit is operated by the scanning continuation circuit to continue the scanning of scanning pulses after the output of an operational power source voltage is terminated and until a scanning pulse voltage decreases below an effective display threshold voltage of a liquid crystal layer. Thus, by continuing the scanning of scanning pulses after terminating the operational voltage power source, lower direct current voltage components remain, thereby making it possible to prevent appearance of streak display defects.

In the conventional configuration shown in FIG. 11, the resistance of the discharge resistor R is set to a low value so that unnecessary electric charges remaining in each pixel of the display panel 130 can be sufficiently quickly discharged to GND (the earth), i.e., the fall of the power source is caused to be steep. In this case, for example, a current of about 0.1 mA consistently flows through the discharge resistor R in driving, so that the total power consumption of the liquid crystal display apparatus 100 is increased by about 1.0 mW. Low power consumption cannot be achieved. Thus, an attempt to overcome the afterimage problem by steepening the fall of the power source unfortunately leads to an increase in power consumption. If the resistance of the discharge resistor R is set to be relatively high in favor of power consumption, the fall and rise of the power source are moderate as indicated by arrow B in FIG. 12. In this case, electric charges are not sufficiently removed from pixels, resulting in an afterimage.

A latch-up phenomenon or the like occurs depending on the discharge conditions for a pixel, which may destroy a driver IC for driving liquid crystal provided in the display panel 130. To address the latch-up phenomenon or the like, a diode is provided in an output portion of the liquid crystal driver IC, however it is insufficient. Specifically, when a main power source falls, the voltage becomes unstable, leading to destruction of the display driver.

When unnecessary electric charges remaining in pixels in the display panel 130 are only discharged to GND (the earth) by the discharge circuit of FIG. 11, the pixel is affected by crosstalk when discharging from the output line. To address this crosstalk problem, unnecessary electric charges remaining in the pixel electrode are discharged to GND (the earth) by sensing the OFF state (fall) of the main power source and applying a HIGH voltage to the gate electrode of the TFT of the pixel as indicated by arrow C in FIG. 12. The discharge from the pixel electrode depends on the final state of display (display image) immediately before turning OFF the power source. As indicated by arrow D in FIG. 12, the HIGH voltage period is unstable due to the power source in the off state. Therefore, the period of time for discharging from the pixel (electric charge removing period) cannot be adjusted. Thus, similar to the portion indicated by arrow A in FIG. 9, an afterimage is likely to occur.

Specifically, as shown in the timing chart (FIG. 12) of signal voltages applied to the display panel 130 of FIG. 11, the fall and rise of the pixel voltage at the plus (+) side and minus (−) side thereof depend on the final state of image displaying immediately before turning OFF the power source when discharging electric charges remaining in pixels. The period of time during which a HIGH voltage is applied to the gate electrode of a TFT is not constant (HIGH period instability). Therefore, the discharging period of electric charges remaining in pixels cannot be adjusted, so that the afterimage problem cannot be completely overcome. Thus, pixel electric charges on the display screen are not uniformly removed, resulting in an afterimage. Since there is a parasitic capacitance between each pixel and the power source circuit 120, the voltage quickly falls, resulting in an adverse effect on the displayed images (crosstalk).

Further, in the case of a small-size liquid crystal display (small-size liquid crystal module) used for a small-size portable apparatus, such as a mobile telephone or the like, the main power source is in the ON state even when the output is in the OFF state (waiting for a call). Therefore, an analog voltage is likely to be applied to a source bus line, resulting in a reduction in the reliability of the liquid crystal display.

In the above-described publications, the display abnormality occurring when the power source is in the OFF state is prevented. However, the above-described problems are not solved therein. As shown in FIG. 14, the discharge of the pixel voltage depends on an image displayed immediately before turning OFF the power source. The electric charge removing period (HIGH period) is unstable. The latch-up phenomenon is also likely to occur. The fall of the power source is gradual. Therefore, electric charges tend to remain in pixels, resulting in an afterimage after turning OFF the power source.

SUMMARY OF THE INVENTION

According to an aspect of the present invention, a power source apparatus for a display is provided, which comprises a voltage generating section capable of controlling outputting or output termination of one or more predetermined output voltages, and a switching section provided between an output terminal of the predetermined output voltage and a predetermined reference potential terminal. The switch section is turned from OFF to ON when the voltage generating section performs the output termination control.

In one embodiment of this invention, based on an input control signal, the voltage generating section controls the outputting or the output termination and the switching section controls ON and OFF switching.

In one embodiment of this invention, a resistor element is provided between the switching section and the reference potential terminal and/or the output terminal.

According to another aspect of the present invention, an image display apparatus is provided, which comprising the above-described power source apparatus for a display, a display controller for outputting a display signal, and a display section for displaying images based on the display signal and the output voltage.

In one embodiment of the present invention, the display section includes a plurality of pixels each connected via a transistor to a gate line and a source line, and the plurality of pixels each are arranged in the vicinity of an intersection of the gate line and the source line and are arranged in a matrix.

In one embodiment of this invention, the display controller performs mask writing by applying a pixel voltage of 0 (V) or a predetermined value to each pixel for one horizontal time period or more based on a predetermined power source OFF ready signal, and thereafter, terminates power source supply from the power source apparatus for a display by outputting the input control signal to the power source apparatus for a display.

According to another aspect of the present invention, an image display apparatus is provided, which comprises a display controller for outputting a display signal, and a display section for displaying images based on the display signal, the display section including a plurality of pixels each connected via a transistor to a gate line and a source line, and the plurality of pixels each being arranged in the vicinity of an intersection of the gate line and the source line and being arranged in a matrix. The display controller performs mask writing by applying a pixel voltage of 0 (V) or a predetermined value to each pixel for one horizontal time period or more based on a predetermined power source OFF ready signal, and thereafter, terminates power source supply to the display section.

In one embodiment of this invention, the predetermined pixel voltage applied to each pixel in mask writing is a normal state voltage.

In one embodiment of this invention, the same voltage is applied to a source electrode or pixel electrode and a common electrode or counter electrode of each pixel in mask writing.

In one embodiment of this invention, the source electrode and the common electrode are grounded after the mask writing and before the termination of power source supply, and a HIGH level of voltage is applied to the gate electrodes of all or part of gate lines for a predetermined period of time.

In one embodiment of this invention, the predetermined output voltage is any of a gate LOW voltage; a gate HIGH voltage, a source/common reference voltage; the gate LOW voltage and the gate HIGH voltage; and the source/common reference voltage, gate LOW voltage and gate HIGH voltage.

In one embodiment of this invention, the predetermined reference potential terminal is an earth connection terminal; when the predetermined output voltage includes a gate LOW voltage lower than an earth voltage and a gate HIGH voltage higher than the earth voltage, a first switching section connected to an output terminal of the gate LOW voltage and a second switching section connected to an output terminal of the gate HIGH voltage are controlled so that the rise of the gate LOW voltage is more gradual than the fall of the gate HIGH voltage when the first and second switching sections are turned ON.

In one embodiment of this invention, the first and second switching sections are active elements, and the image display apparatus is controlled by element characteristics of the active elements so that the rise of the gate LOW voltage is more gradual than the fall of the gate HIGH voltage.

In one embodiment of this invention, a resistor element is provided between the first switching section and the earth connection terminal and/or the output terminal of the gate LOW voltage.

In one embodiment of this invention, the image display apparatus further comprises a first resistor element provided between the first switching section and the earth connection terminal and/or the output terminal of the gate LOW voltage, and a second resistor element provided between the earth connection terminal and/or the output terminal of the gate HIGH voltage. The resistance of the first resistor element is greater than the resistance of the second resistor element.

Functions of the above-described constitution will be described below.

In the power source apparatus for a display according to the present invention, the active element as the switching section is in the OFF state in driving the power source, and therefore, leakage current does not consistently flow through the earth connection terminal (reference potential terminal), thereby realizing low power consumption.

Further, when the power source is in the OFF state, the active element is in the ON state and constitutes a discharge circuit. Therefore, the power source voltage can be caused to steeply drop while keeping low power consumption, thereby making it possible to discharge electric charges remaining in pixels and prevent occurrence of afterimages. Furthermore, in this case, the active element, or a discharge resistor connected to the active element in series, serves as a current suppressing means, thereby making it possible to prevent the latch-up phenomenon.

Furthermore, when the power source is in the OFF state, the power source output terminal is grounded. Therefore, it is unlikely that an analog voltage is applied to a source bus line as in conventional devices, thereby improving the reliability of the display.

Furthermore, in the case of mask writing, when a predetermined pixel voltage applied to pixels in mask writing is a constant low voltage corresponding to a normal state (normally white or normally black), afterimages can be more easily overcome. In addition, HIGH time period control of the gate voltage may be performed after mask writing, thereby making it possible to sufficiently discharge electric charges remaining in pixels and overcome afterimages.

Thus, the invention described herein makes possible the advantages of providing a power source apparatus for a display which achieves low power consumption in driving and prevents afterimages after turning OFF the power source and the latch-up phenomenon as well as improving display reliability; and an image display apparatus incorporating the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of Embodiments 1, 2 and 3, where a power source apparatus for a display according to the present invention is applied to a liquid crystal display apparatus, with reference to the accompanying drawings.

Embodiment 1

Figure 1:
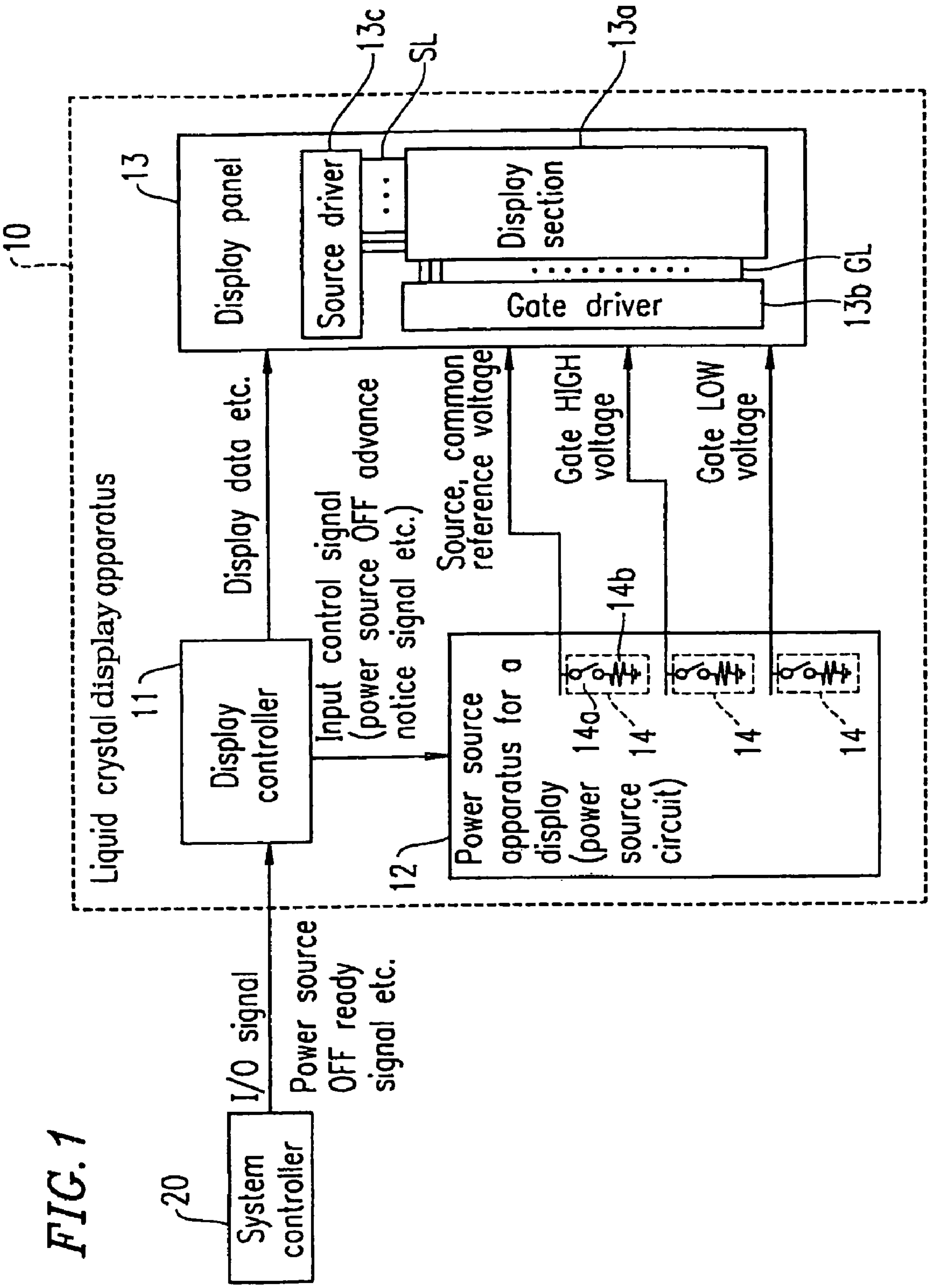
FIG. 1 is a block diagram showing a liquid crystal display apparatus according to Embodiment 1 of the present invention.

FIG. 1 is a block diagram showing a liquid crystal display apparatus according to Embodiment 1 of the present invention.

Referring to FIG. 1, a liquid crystal display apparatus 10 comprises a display controller 11, a power source circuit 12 (power source apparatus for a display), and a display panel 13 having a display section 13*a*.

The display controller 11 receives I/O (Input/Output) signals, a power source OFF ready signal and the like output from an external system controller 20 and outputs various signals, such as display data and the like, to the display panel 13 as well as a power source OFF advance notice signal (input control signal) to a power source circuit 12.

The power source circuit 12 receives a power source OFF advance notice signal and the like from the display controller 11. The power source circuit 12 has a discharge circuit 14 comprising a FET-SW (switching means comprising a FET transistor) 14*a* which transitions the ON state to the OFF state based on a power source OFF advance notice signal and a resistor 14*b* connected in series thereto. Note that the resistor 14*b* is provided between the FET-SW 14*a* and an earth contact terminal as a reference potential contact terminal. Alternatively, the resistor 14*b* may be provided between the FET-SW 14*a* and the voltage output terminal of the power source circuit 12. Alternatively, the resistor 14*b* may be provided at both of the above-described positions.

The FET-SW 14*a* and the resistor 14*b* are connected between each output terminal of the power source circuit 12 and GND (earth terminal). The power source circuit 12 outputs a source reference voltage and a common reference voltage (source and common reference voltages) via the output terminal to the TFT and the common electrode, respectively, of each pixel in the display panel 13, and outputs a gate HIGH voltage or a gate LOW voltage to the gate electrodes of TFTs on each gate line GL.

The display panel 13 further comprises a gate driver 13*b* for driving a plurality of gate lines GL and a source driver 13*c* for driving a plurality of source lines SL. In the display section 13*a*, a plurality of pixels are arranged in a matrix such that each pixel is located in the vicinity of the (orthogonal) intersection of the gate line GL and the source line SL and the pixel is connected via a TFT to the gate line GL and the source line SL. The display panel 13 receives various signals (e.g., display data and the like) output from the display controller 11 and the above-described predetermined output voltages (a source/common reference voltage, a gate HIGH voltage, and a gate LOW voltage) output from the power source circuit 12, and performs image displaying on the display section 13*a* via the driver 13*b* and the source driver 13*c*.

Figure 2:
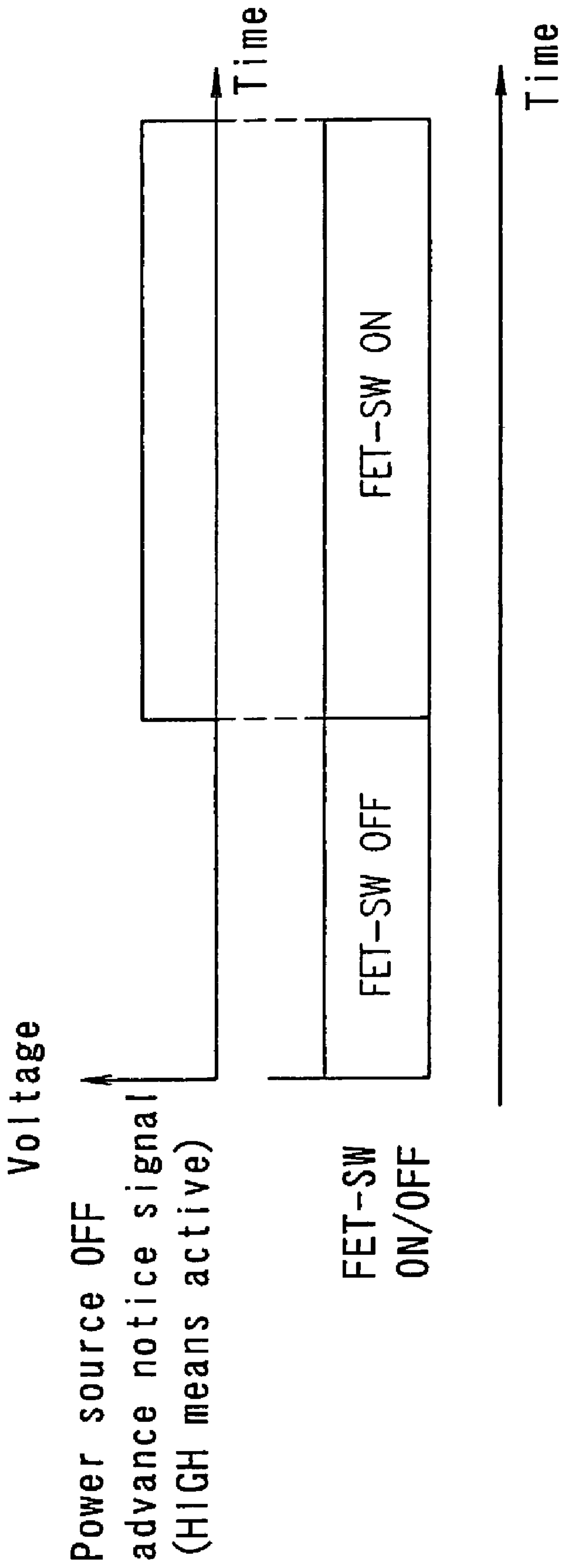
FIG. 2 is a diagram showing an operation of a FET-SW of FIG. 1.

FIG. 2 is a diagram showing an operation of the FET-SW 14*a* of FIG. 1.

Referring to FIG. 2, the FET-SW 14*a* is turned ON when receiving an active (HIGH level) power source OFF advance notice signal from the display controller 11, and is turned OFF when the power source OFF advance notice signal goes to the LOW level. Thus, the FET-SW 14*a* performs an ON/OFF operation based on the power source OFF advance notice signal. The FET-SW 14*a* is turned OFF when driving the liquid crystal display apparatus 10, and is turned ON when terminating the liquid crystal display apparatus 10.

Figure 3:
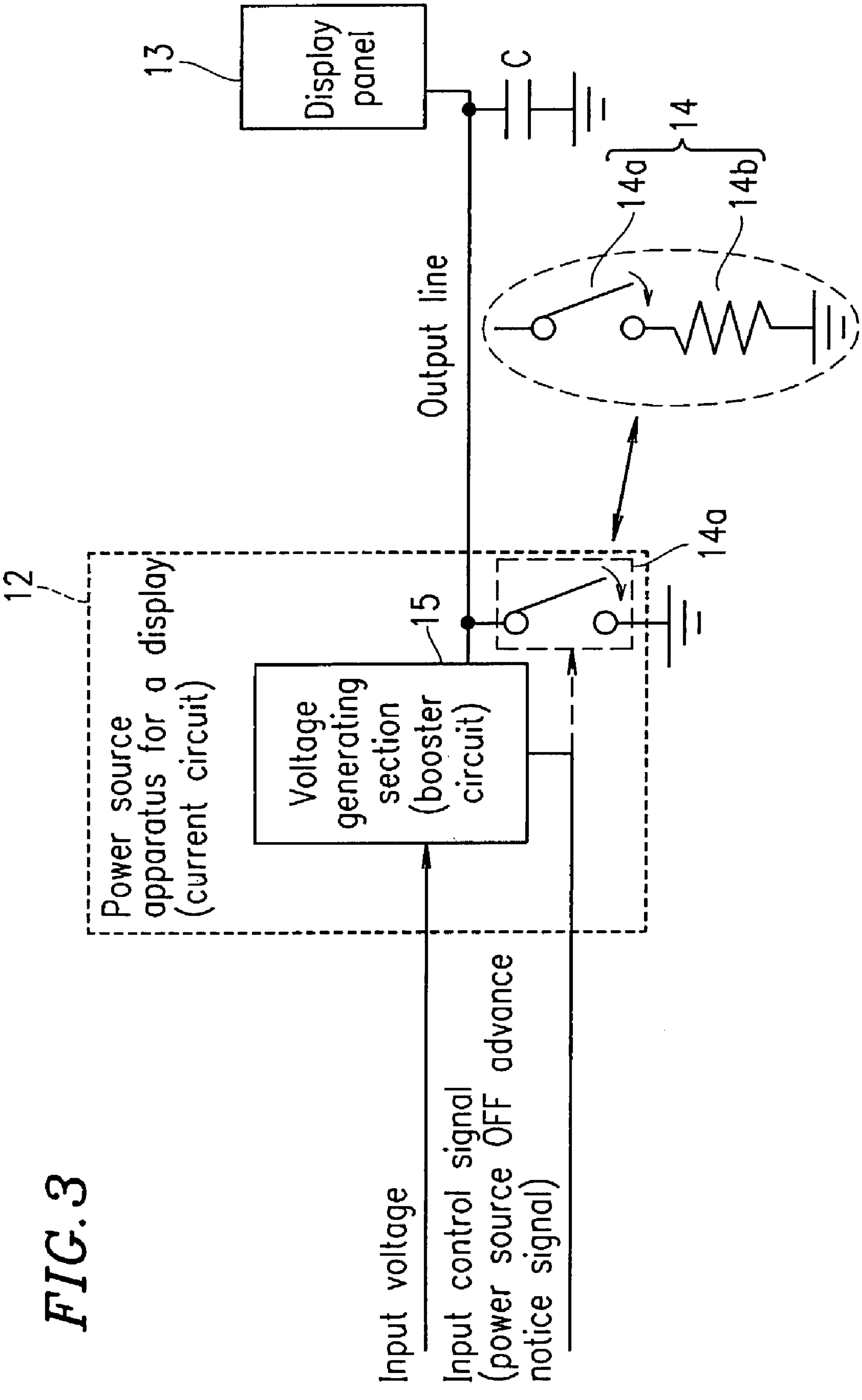
FIG. 3 is a circuit diagram showing a power source circuit of FIG. 1.

FIG. 3 is a circuit diagram showing the power source circuit 12 of FIG. 1.

As shown in FIG. 3, the power source circuit 12 has a discharge circuit 14 comprising the FET-SW 14*a* and a resistor 14*b* (though it may be made only of the FET-SW 14*a*) and a booster circuit 15 (it may be a voltage step down circuit) as a voltage generating means. A capacitor C is connected between an output line from the power source circuit 12 and GND (earth terminal) in parallel to the circuit 14 comprising the FET-SW 14*a* and the resistor 14*b*.

In the discharge circuit 14 comprising the FET-SW 14*a* and the resistor 14*b*, for example, the drain terminal and the source terminal each is connected between the output terminal of the booster circuit 15 and GND (earth terminal). The gate terminal of the FET-SW 14*a* receives a power source OFF advance notice signal as an input control signal. Therefore, when the FET-SW 14*a* is in the ON state or in the OFF state, the booster circuit 15 is oppositely in the OFF state or in the ON state. Note that by adjusting the resistance of the resistor 14b, the rate of discharge can be regulated.

Based on an externally input voltage, the booster circuit 15 generates a predetermined voltage, such as a source/common reference voltage, a gate HIGH voltage and a gate LOW voltage, and the like, which are output to the output terminals of the power source circuit 12. The booster circuit 15 is turned OFF when an active (HIGH level) power source OFF advance notice signal is input, and is turned ON when a power source OFF advance notice signal goes to a LOW level.

Figure 6:
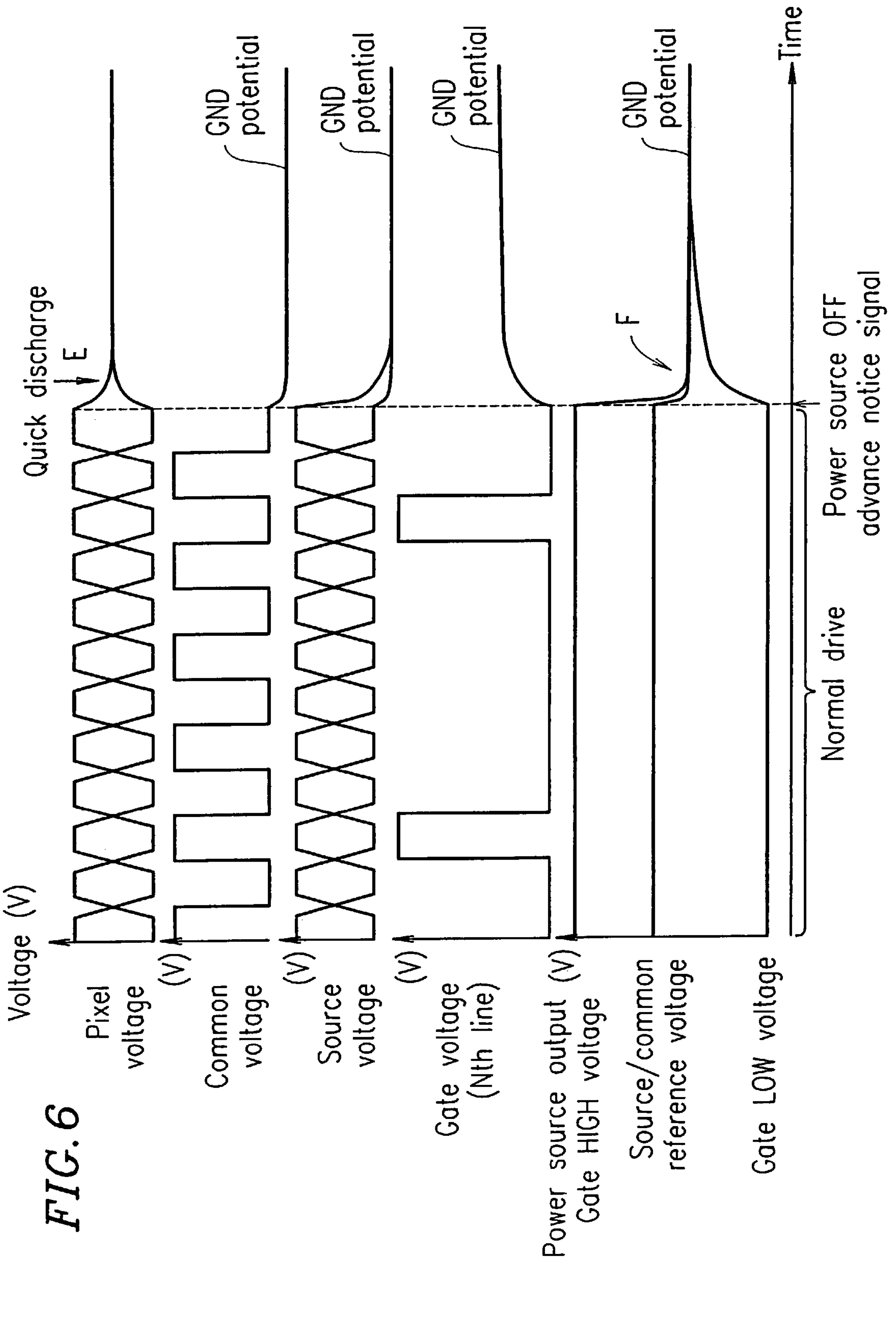
FIG. 6 is a timing chart of signal voltages applied to the display panel of the liquid crystal display apparatus of FIG. 1.

Accordingly, in the power source circuit 12 (a power source apparatus for a display according to the present invention), the FET-SW 14a can be used to discharge electric charges held in the pixel electrode and the common electrode of each pixel in the display panel 13 of the liquid crystal display apparatus 10 within a short time after the output voltage to the display panel 13 is in the OFF state as indicated by arrow E in FIG. 6. As a result, an afterimage can be prevented from occurring when the power source is turned OFF. The time required for discharging the residual electric charge can be arbitrarily adjusted with the resistance of the resistor 14b provided between the source terminal of the FET-SW 14a and GND (earth). Therefore, by sufficiently discharging the electric charges remaining in pixels, an afterimage can be prevented from occurring when the power source is turned OFF.

Figure 4A:
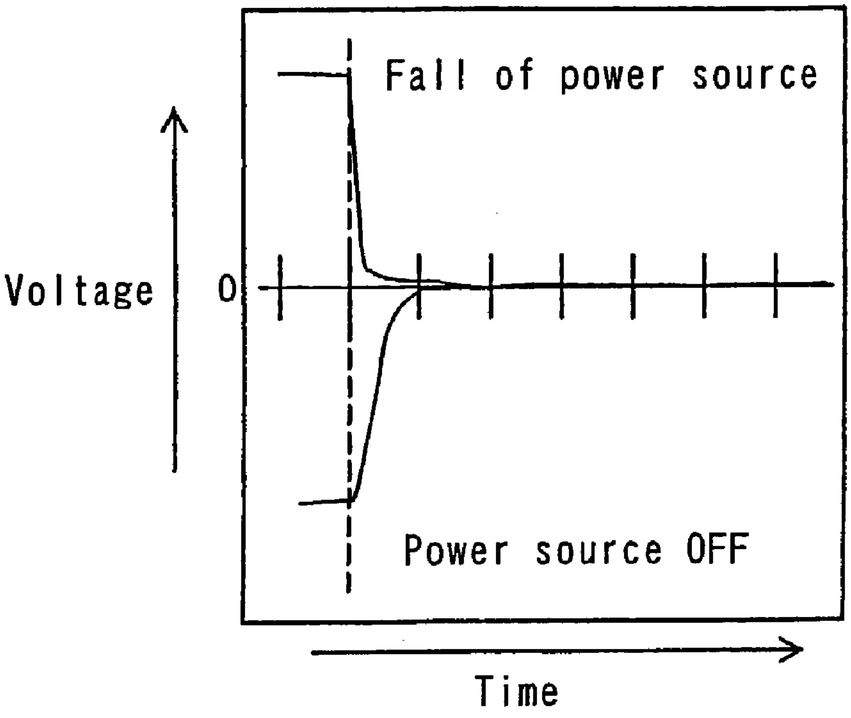
FIG. 4A is a diagram showing the fall or rise of a source/common reference voltage, a gate HIGH voltage and a gate LOW voltage supplied to a display panel of FIG. 1 immediately after being turned OFF.
Figure 4B:
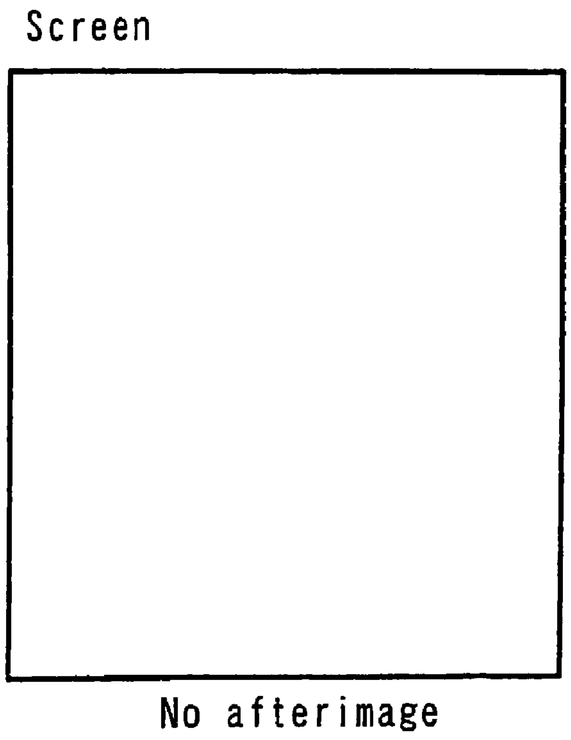
FIG. 4B is a diagram showing an afterimage on the display panel in the state of FIG. 4A.

A state in which an afterimage is overcome will be described with reference to FIGS. 4A and 4B. FIG. 4A is a diagram showing the fall or rise of the source/common reference voltage, the gate HIGH voltage and the gate LOW voltage of the power source circuit 12 immediately after the power source circuit 12 is turned OFF. FIG. 4B is a diagram showing an afterimage on the display panel 13 in the state of FIG. 4A.

As shown in FIG. 4A, the source/common reference voltage supplied to the display panel 13 steeply falls, so that residual electric charges are quickly discharged or charged. Therefore, no afterimage occurs as shown in FIG. 4B.

As indicated by arrow F in FIG. 6, the fall or rise of the gate HIGH voltage and the gate LOW voltage is set by the FET-SW 14a such that the rise of the gate LOW voltage is transitioned slightly more gradually than the fall of the gate HIGH voltage. To achieve this, the current characteristics of a field effect transistor (FET) (the element characteristics of an active element) itself of the FET-SW 14a may be utilized. Alternatively, the FET itself may have resistance by changing the value of a voltage (power source OFF advance notice signal) input to the gate thereof. Alternatively, two different resistors may be provided and selected by two respective FETs. The current characteristics of the FET itself of the FET-SW 14a substantially prevent a sudden, large volume of current.

In this manner, the fall or rise of the gate HIGH voltage or the gate LOW voltage can be separately designed using the FET-SW 14a, there by preventing abnormality, such as the latch-up phenomenon of the liquid crystal driver IC or the like. Thus, the liquid crystal driver IC is protected.

Figure 5A:
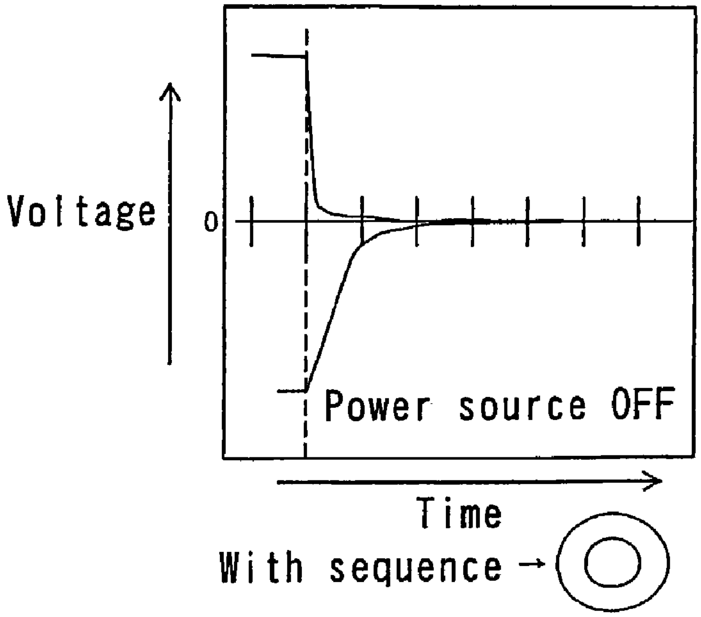
FIG. 5A is a diagram showing the fall and rise of a source/common reference voltage, a gate HIGH voltage and a gate LOW voltage supplied to a display panel of FIG. 1 when the FET-SW and a resistor of FIG. 1 are employed.
Figure 5B:
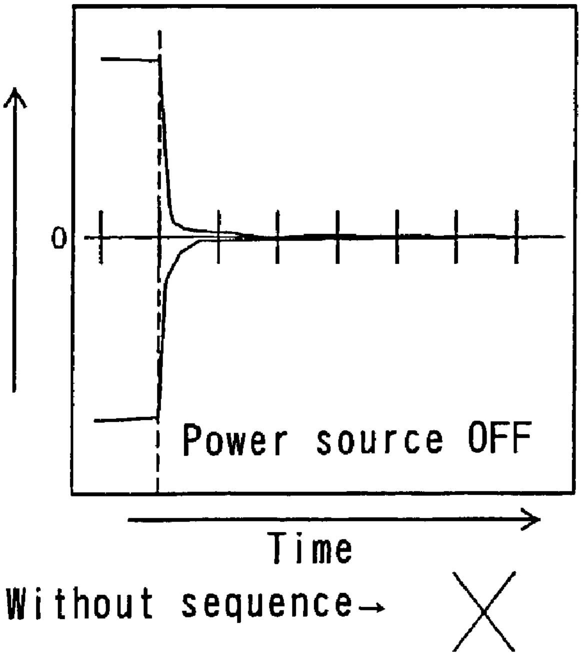
FIG. 5B is a diagram showing the fall and rise of a source/common reference voltage, a gate HIGH voltage and a gate LOW voltage supplied to a display panel of FIG. 1 when the FET-SW is simply driven.

FIGS. 5A and 5B are diagrams showing the fall and rise of the gate HIGH voltage and the gate LOW voltage, respectively. FIG. 5A shows the case where the FET-SW 14a and the resistor 14b of the present invention are employed (with sequence). FIG. 5B shows the case where the FET-SW 14a is simply driven (without sequence).

As shown in FIG. 5B, when the switch FET-SW 14a is only simply driven (without sequence), the rise of the gate LOW voltage cannot be designed to be slightly more gradual than the fall of the gate HIGH voltage. Therefore, abnormality occurs in the liquid crystal driver IC due to the latch-up phenomenon or the like.

In the power source circuit 12 of the present invention, when the liquid crystal display apparatus 10 is driven, the FET-SW 14a is in the OFF state so that a stationary leakage current flowing through the resistor R can be prevented. Thus, residual electric charges when the power source is turned OFF can be sufficiently discharged while achieving low power consumption, thereby making it possible to overcome afterimages.

FIG. 6 is a timing chart of signal voltages applied to the display panel 13 of FIG. 1.

A pixel voltage, a common voltage and a source voltage as shown in FIG. 6 are applied to each pixel. The pixel voltage is a voltage synthesized with a difference between the source voltage and the common voltage, which is a pulse-like, alternating voltage. In order to select pixels on each line in the display panel 13, the gate voltage is applied at predetermined time intervals.

The source/common reference voltage, the gate HIGH voltage and the gate LOW voltage input from the power source circuit 12 to the display panel 13 are constant voltages in driving the display panel 13 as shown in FIG. 6.

Thus, as shown in FIG. 4, in the liquid crystal display apparatus 10, when the power source circuit 12 receives a power source OFF advance notice signal for turning OFF the source/common reference voltage, the gate HIGH voltage and the gate LOW voltage, the FET-SW 14a is turned ON so that electric charges held in the pixel electrode and the common electrode of each pixel in the display panel 13 are quickly discharged to the earth. Therefore, no afterimage remains on the OFF-state display panel 13.

Embodiment 2

In Embodiment 2, based on a power source OFF ready signal output from the system controller 20, 0 (V) or any constant voltage is applied as a pixel voltage to each pixel in the display panel 13 (mask writing).

Figure 7:
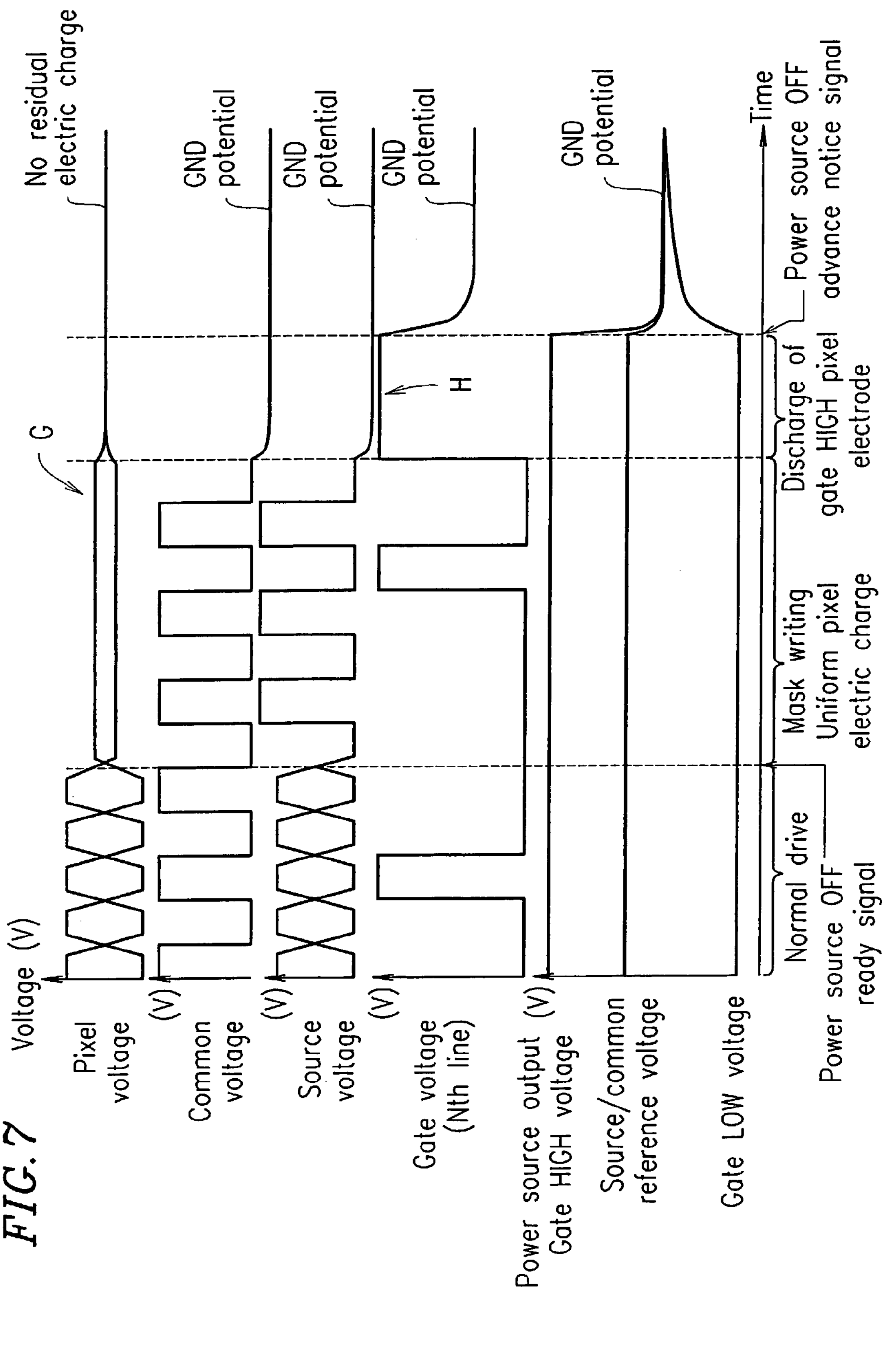
FIG. 7 is a timing chart of signal voltages applied to a display panel of a liquid crystal display apparatus according to Embodiment 2 of the present invention where 0 (V) or any constant voltage is applied as a pixel voltage to each pixel in the display panel (mask writing).
Figure 8:
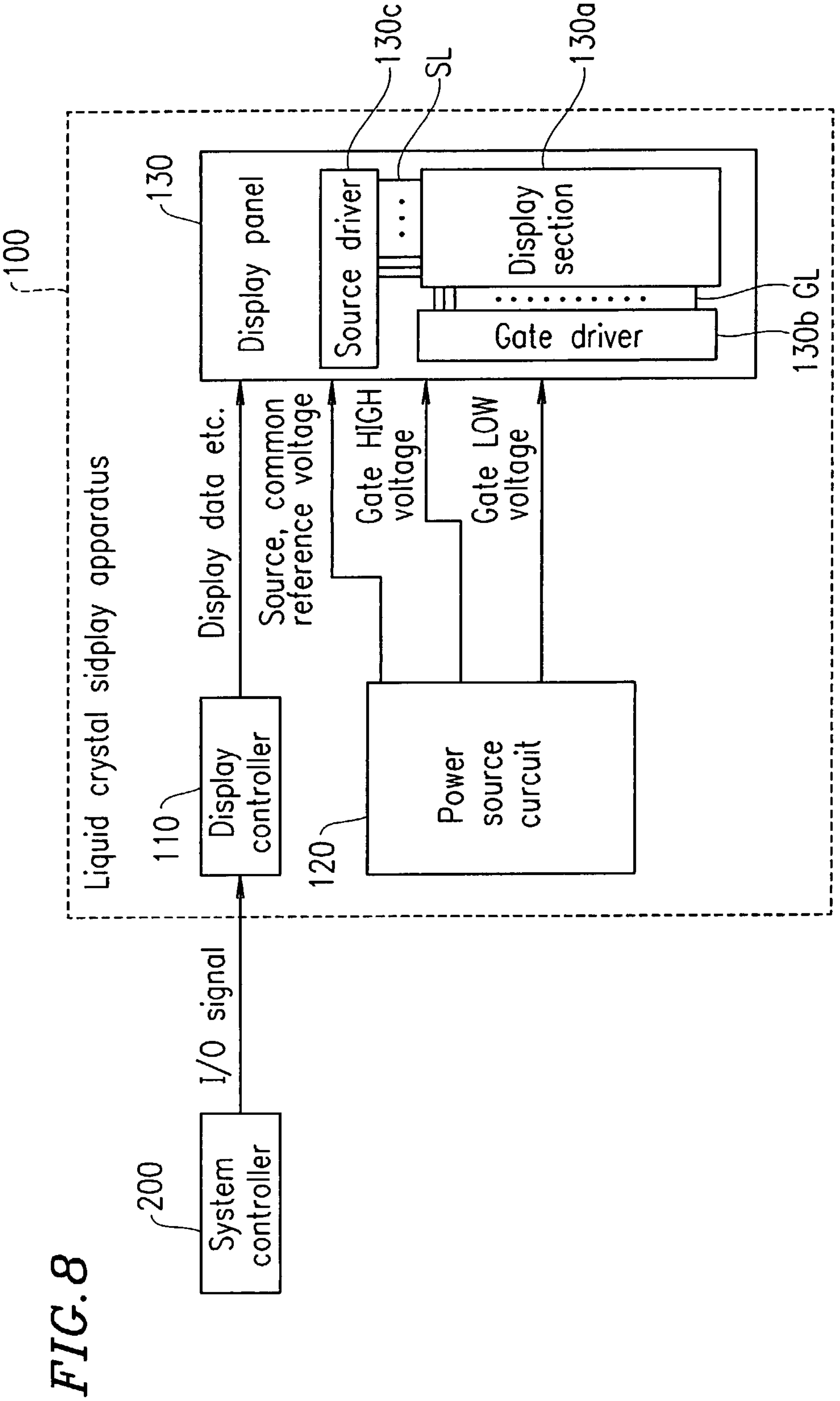
FIG. 8 is a block diagram showing a configuration of a conventional liquid crystal display apparatus.
Figure 9:
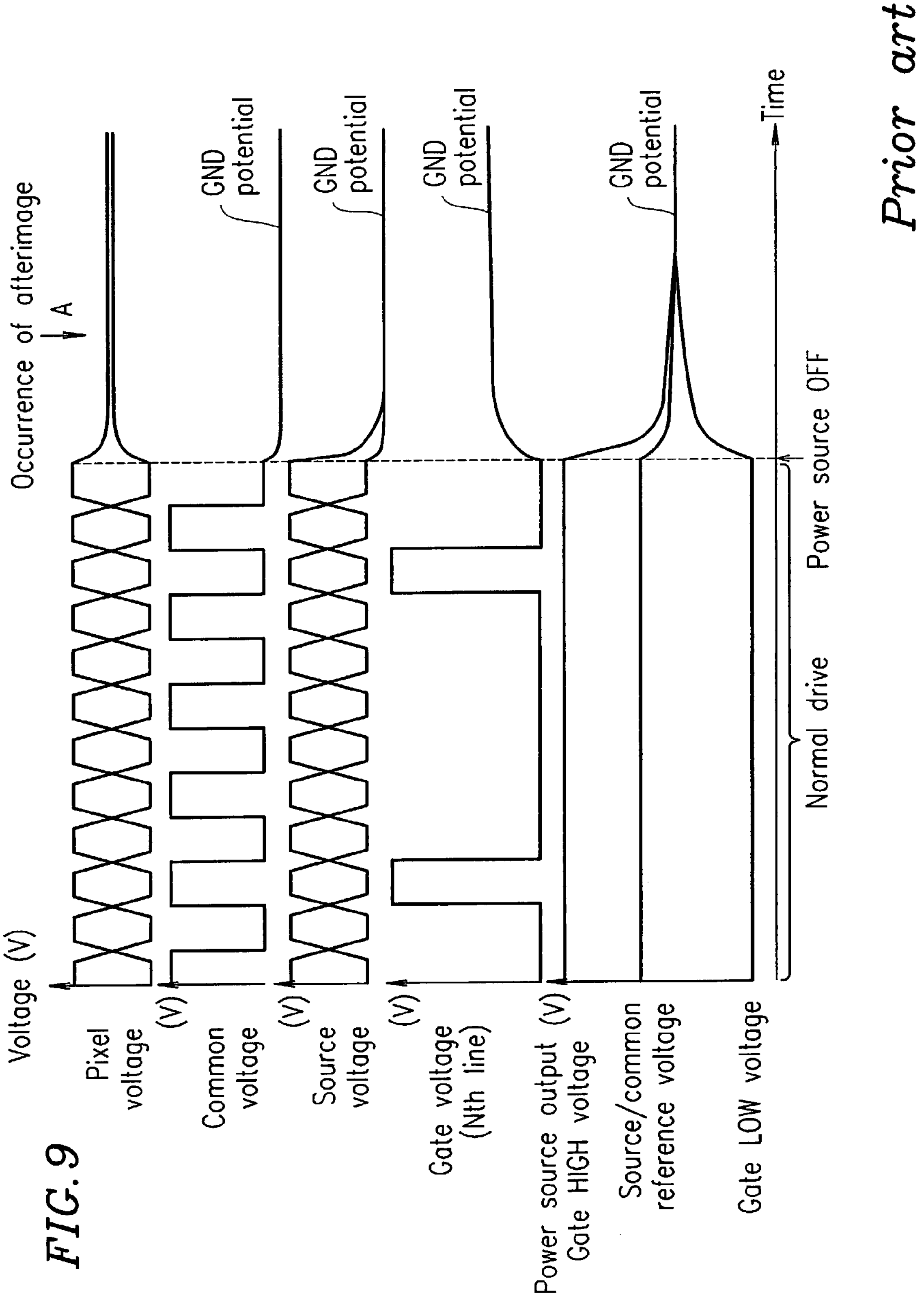
FIG. 9 Prior art
FIG. 9 is a timing chart of signal voltages applied to the display panel of the liquid crystal display apparatus of FIG. 8.
Figure 10A:
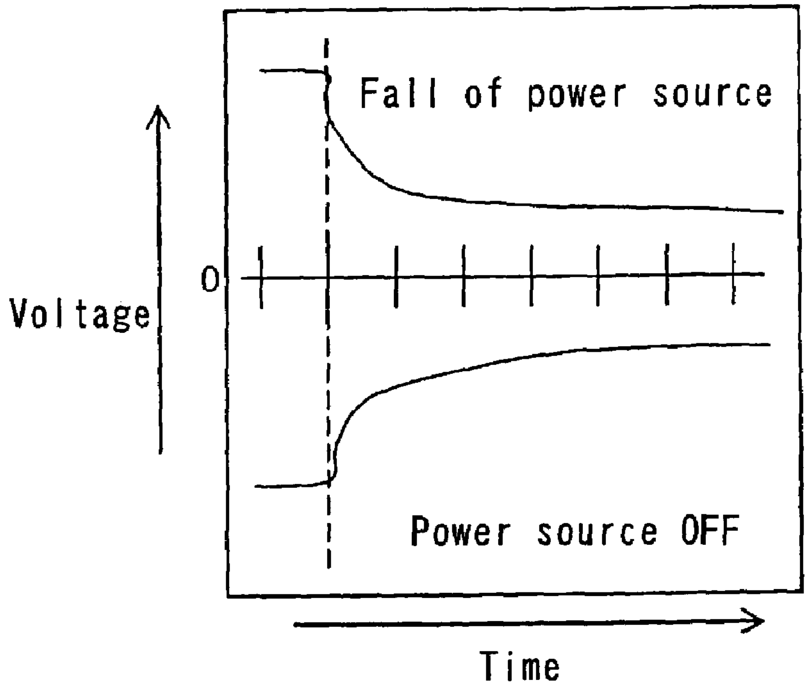
FIG. 10A is an enlarged view showing the fall and rise of a pixel voltage applied to each pixel in a display panel of a conventional liquid crystal display apparatus.
Figure 10B:
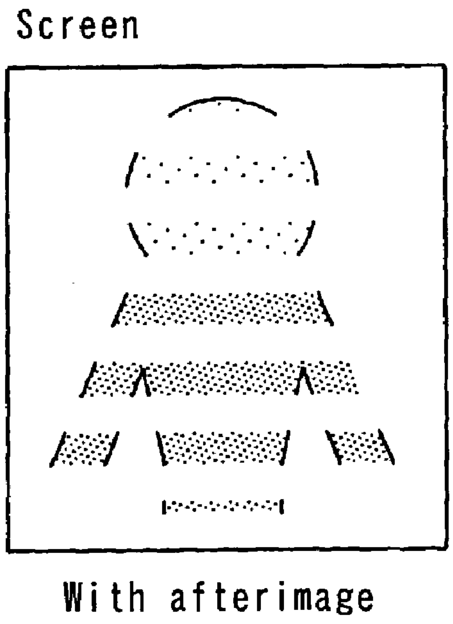
Prior art FIG. 10B
FIG. 10B is a diagram showing an afterimage displayed on the display section in the situation of FIG. 10A.
Figure 11:
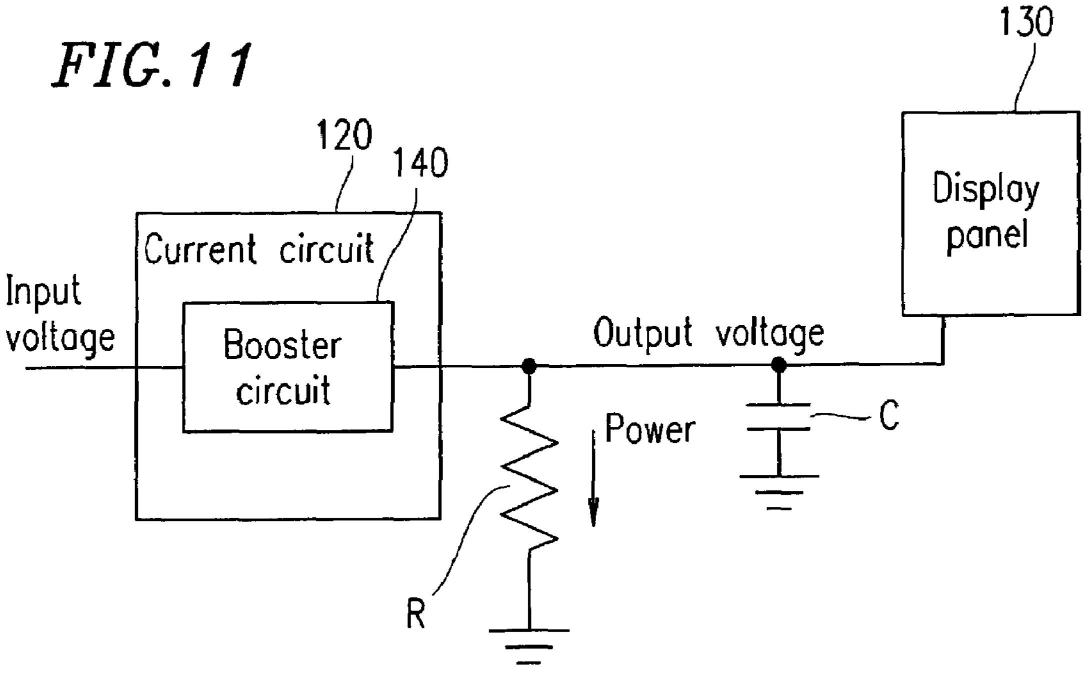
FIG. 11 is a block diagram schematically showing another example of a conventional liquid crystal display apparatus.
Figure 12:
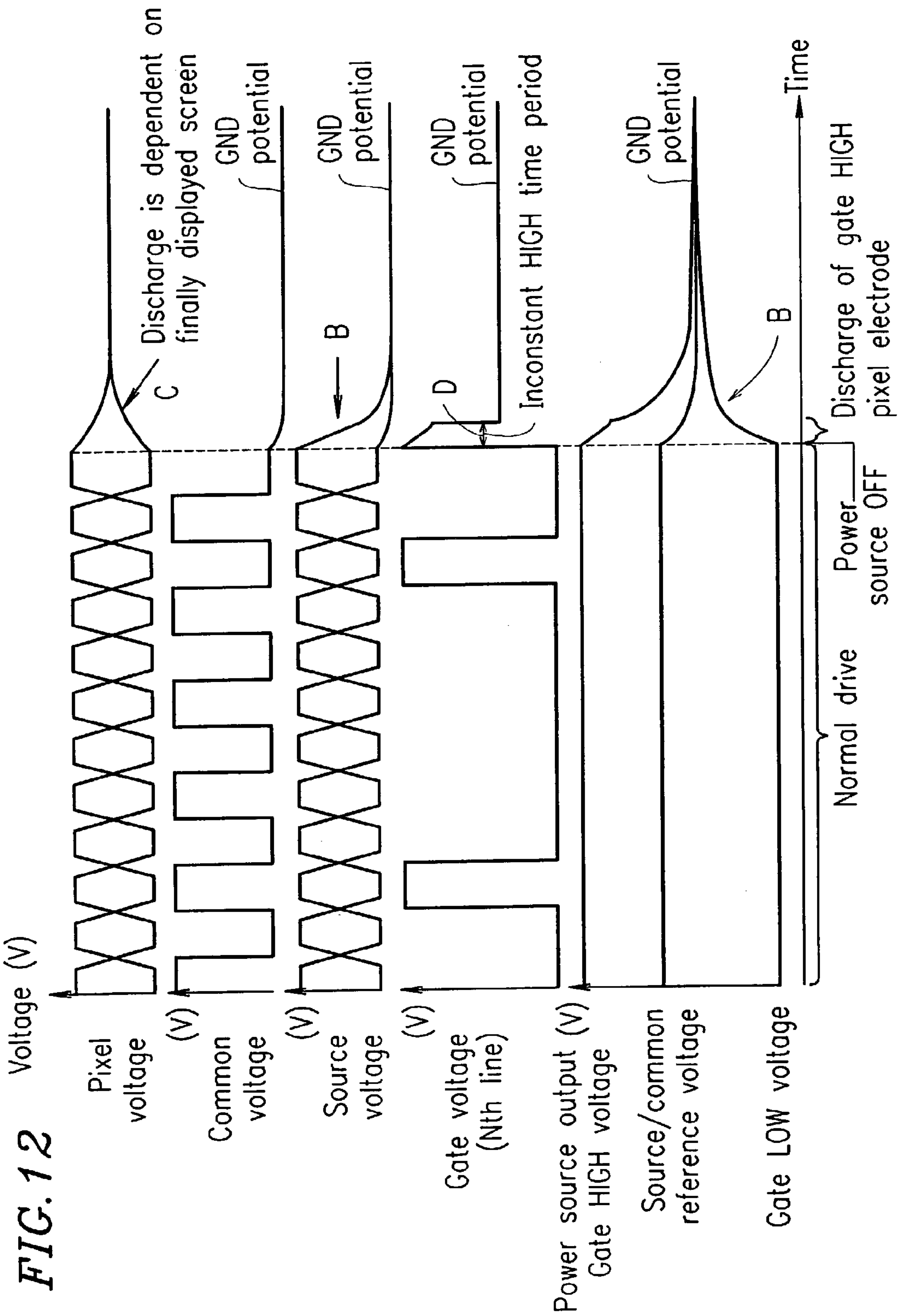
FIG. 12 is a timing chart of signal voltages applied to the display panel of the liquid crystal display apparatus of FIG. 11.
Figure 13:
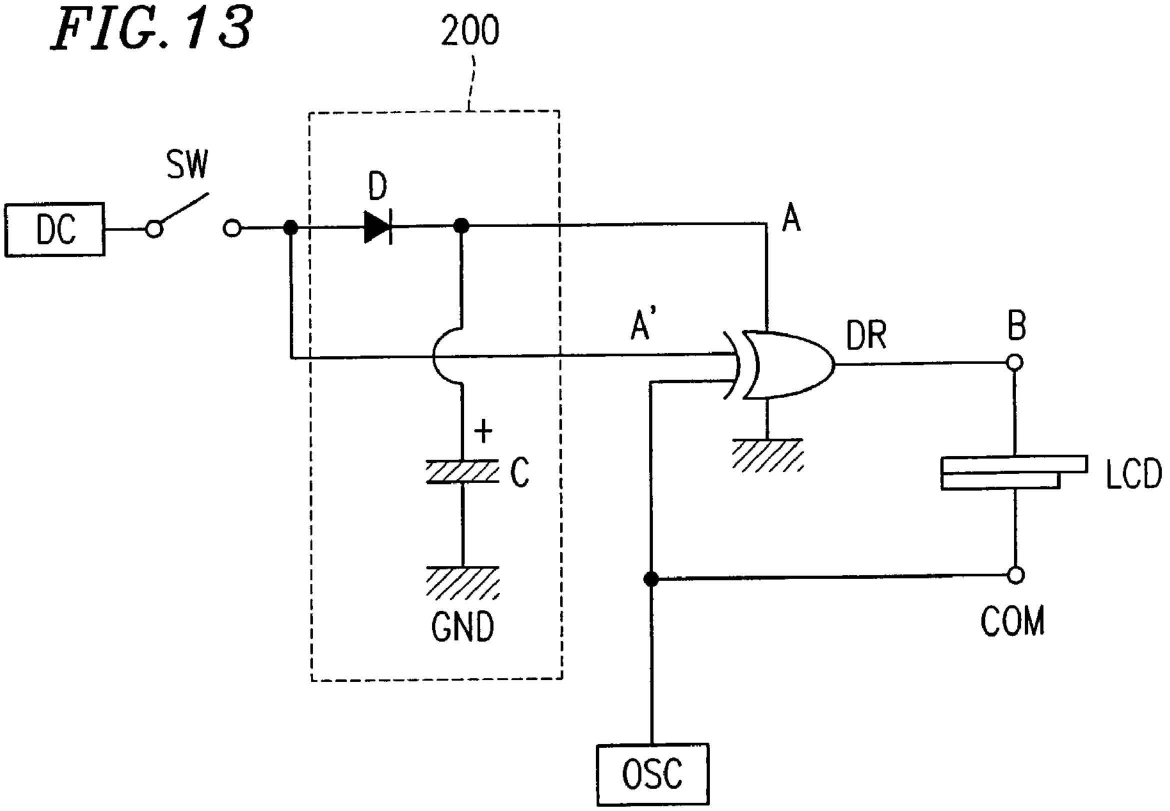
FIG. 13 is a diagram schematically showing a conventional liquid crystal drive circuit.
Figure 14:
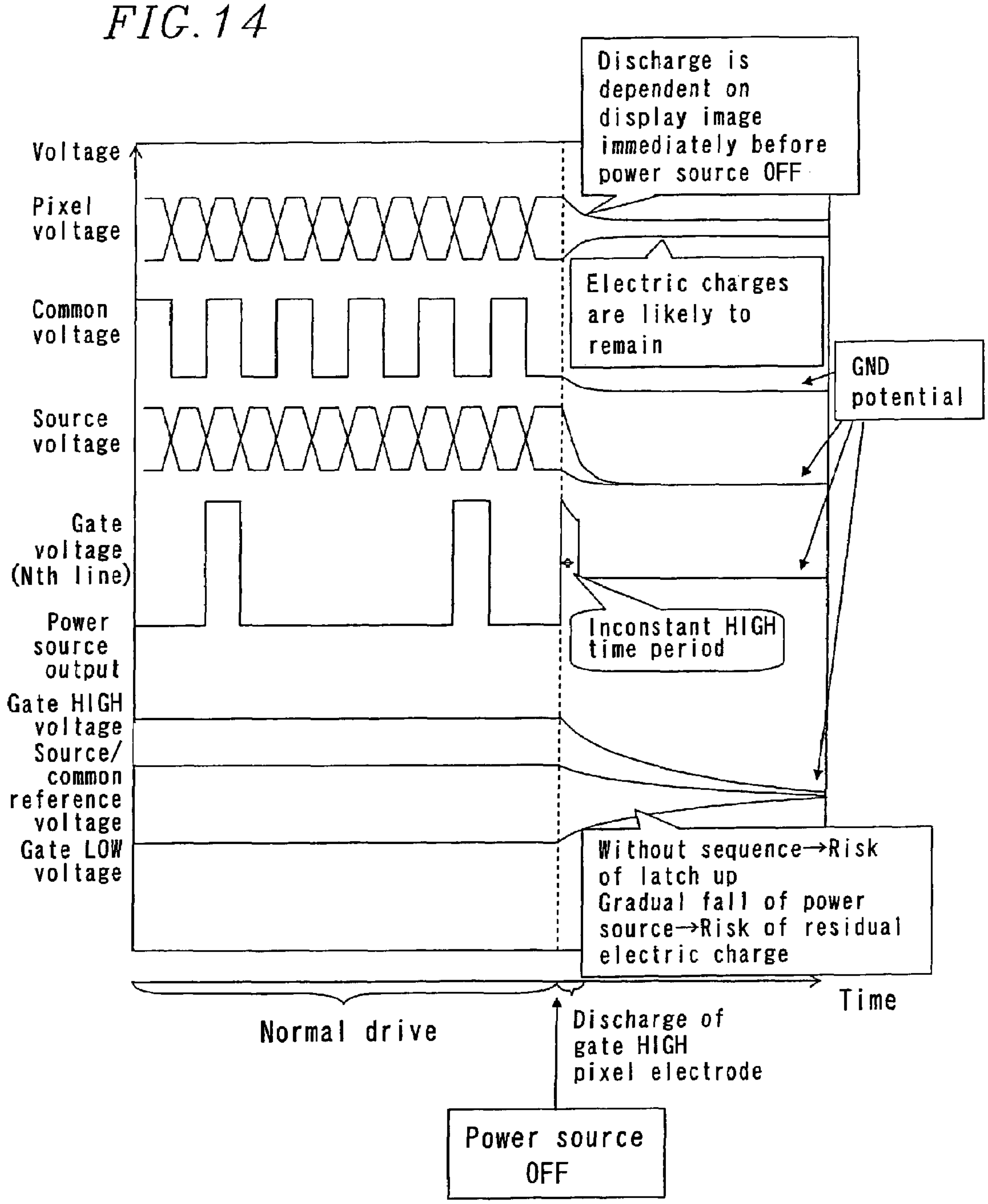
FIG. 14 is a timing chart of signal voltages applied to conventional display panels.
Figure 15:
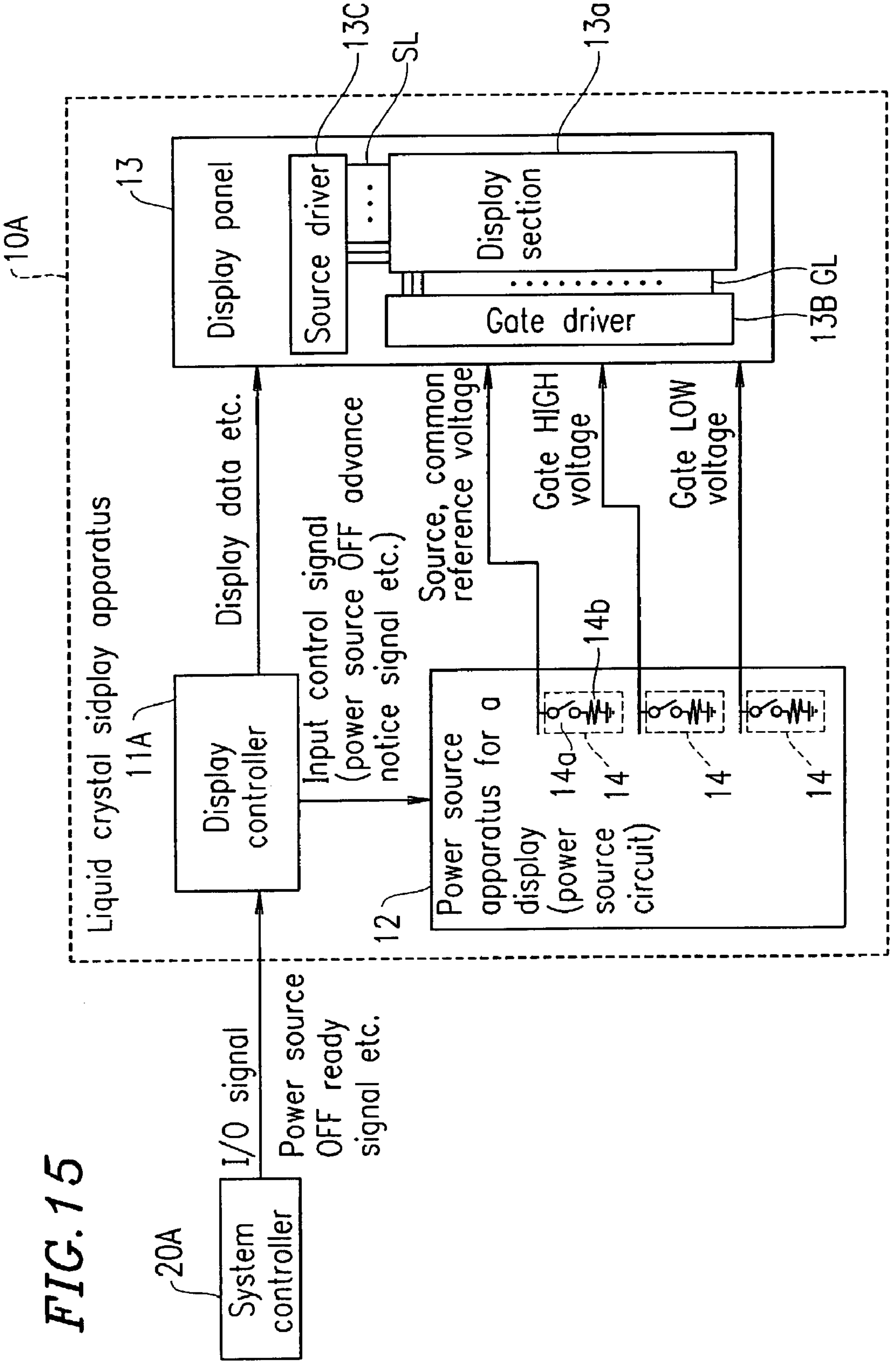
FIG. 15 is a block diagram schematically showing a configuration of a liquid crystal display apparatus according to Embodiment 2 of the present invention.

FIG. 7 is a timing chart of signal voltages applied to a display panel 13 of a liquid crystal display apparatus according to Embodiment 2 of the present invention. The signal voltages are applied to the display panel 13 when 0 (V) or any constant voltage is applied as a pixel voltage to each pixel in the display panel 13 (mask writing). FIG. 15 is a block diagram schematically showing a configuration of a liquid crystal display apparatus 10A according to Embodiment 2 of the present invention. Members having substantially the same action and effect as those of FIG. 1 are referenced by the same numerals.

Referring to FIG. 7, 0 (V) or any constant voltage is applied as a pixel voltage to each pixel in the display panel 13 (mask writing) based on a power source OFF ready signal output from the system controller 20A to a display controller 11A. As a result, the pixel voltage is transitioned to a constant voltage corresponding to a normal state (normally white or normally black). In this case, electric charges held by each pixel are substantially uniform. The time required for mask writing may be greater than or equal to one horizontal time period, for example. If the mask write time is less than one horizontal time period, the liquid crystal of each pixel is unlikely to respond.

Mask writing has to be performed throughout the screen. Typically, driving requires a time greater than or equal to one vertical time period. However, when all gate electrodes go to HIGH (all gate lines are selected), all of the lines can be subjected to mask writing at once. Therefore, writing can be sufficiently performed during at least one horizontal time period.

By providing such a mask writing time period, as indicated by arrow G in FIG. 7, when discharging residual electric charges in pixels in the display panel 13 after turning OFF the power source, the plus (+)-side and minus (−)-side fall and rise of the pixel voltage are independent from the final state of a display image immediately before turning OFF the power source.

Next, the gate HIGH voltage is applied to the gate electrodes of all (or part) of the gate lines in the display panel 13. During the application, the common electrode and the source electrode are grounded. Thereby, electric charges held by the pixel electrode and the common electrode of each pixel in the display panel 13 are discharged.

The time required for discharging residual electric charges can be arbitrarily regulated by controlling (digital control) the period of time during which a HIGH level of voltage is applied to the gate electrode as indicated by arrow H in FIG. 7. Therefore, electric charges remaining in pixels can be sufficiently discharged, thereby making it possible to overcome afterimages.

Further, based on the power source OFF advance notice signal output from the display controller 11, the booster circuit 15 in the power source circuit 12 is turned OFF; the source/common reference voltage, the gate HIGH voltage and the gate LOW voltage are turned OFF; and the FET-SW 14*a* is turned ON. As a result, a discharging process is started using the FET-SW 14*a* of the power source circuit 12, so that the output voltage (gate HIGH voltage) of each gate line drops to the potential of GND (the earth). Therefore, even when the main power source is in the ON state in a ready state in which the output is OFF (waiting for a call) in the case of mobile telephones or the like, it is unlikely that an analog voltage is applied to a source bus line as in conventional devices. Thus, the reliability of the liquid crystal display can be improved.

As described above, residual electric charges in the pixels of the display panel 13 are discharged based on the power source OFF ready signal and the power source OFF advance notice signal shown in FIG. 7. This technique has an advantageous effect compared to when discharging is performed only based on the power source OFF advance notice signal.

Figure 17:
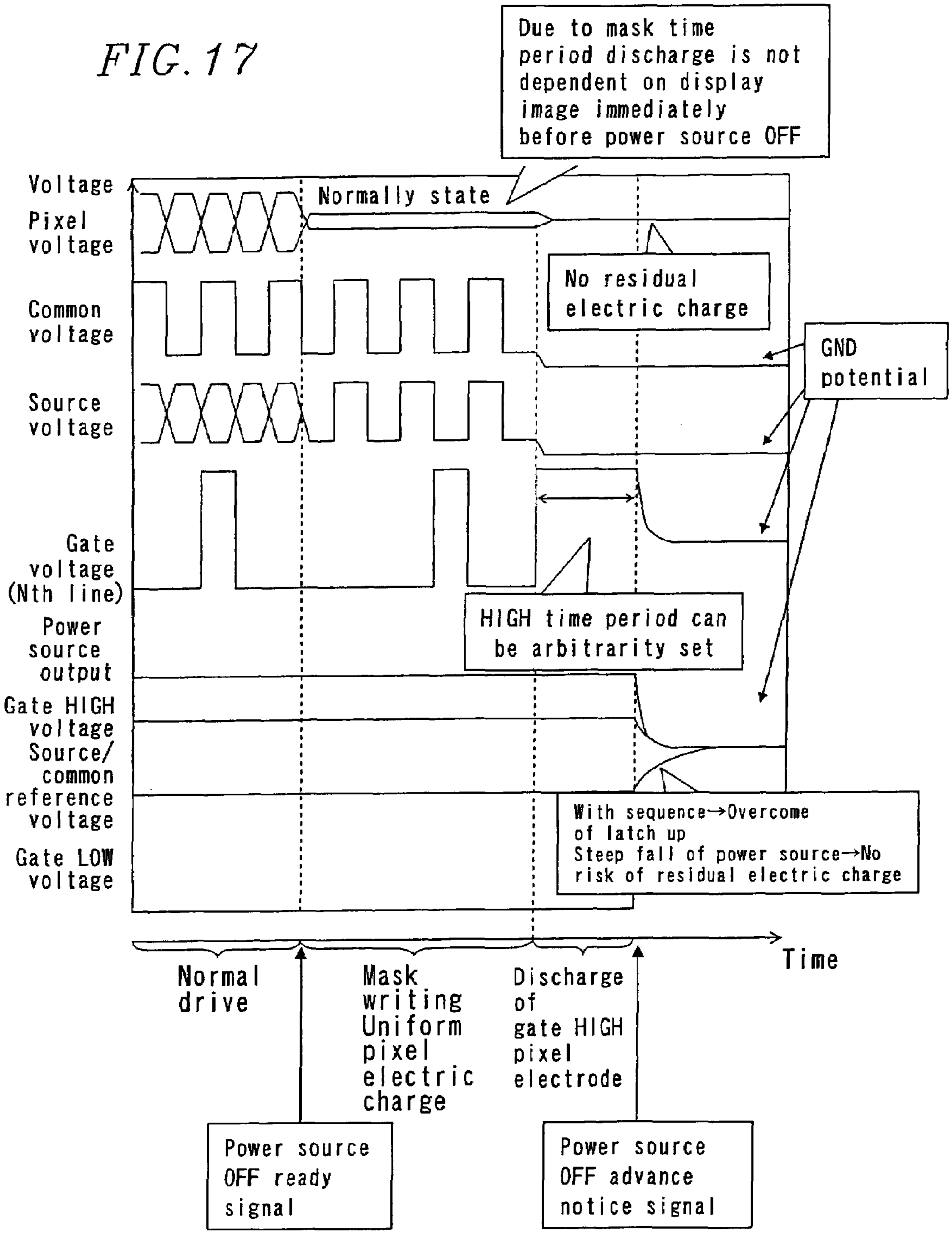
FIG. 17 is a timing chart for explaining the effect of the liquid crystal display apparatus of Embodiment 3 (FIG. 16) using an exemplary timing chart of signal voltages applied to the display panel of the liquid crystal display apparatus of FIG. 15.

Further, as shown in FIG. 17, when the gate power source is discharged and charged in sequence, there is no risk of occurrence of the latch-up phenomenon. Note that an optimal sequence is such that the gate LOW power source goes to the GND potential (earth potential) later than the gate HIGH power source. In addition, the power source can be caused to fall steeply while keeping the power consumption at a very small level, thereby making it possible to overcome residual electric charges.

Embodiment 3

Figure 16:
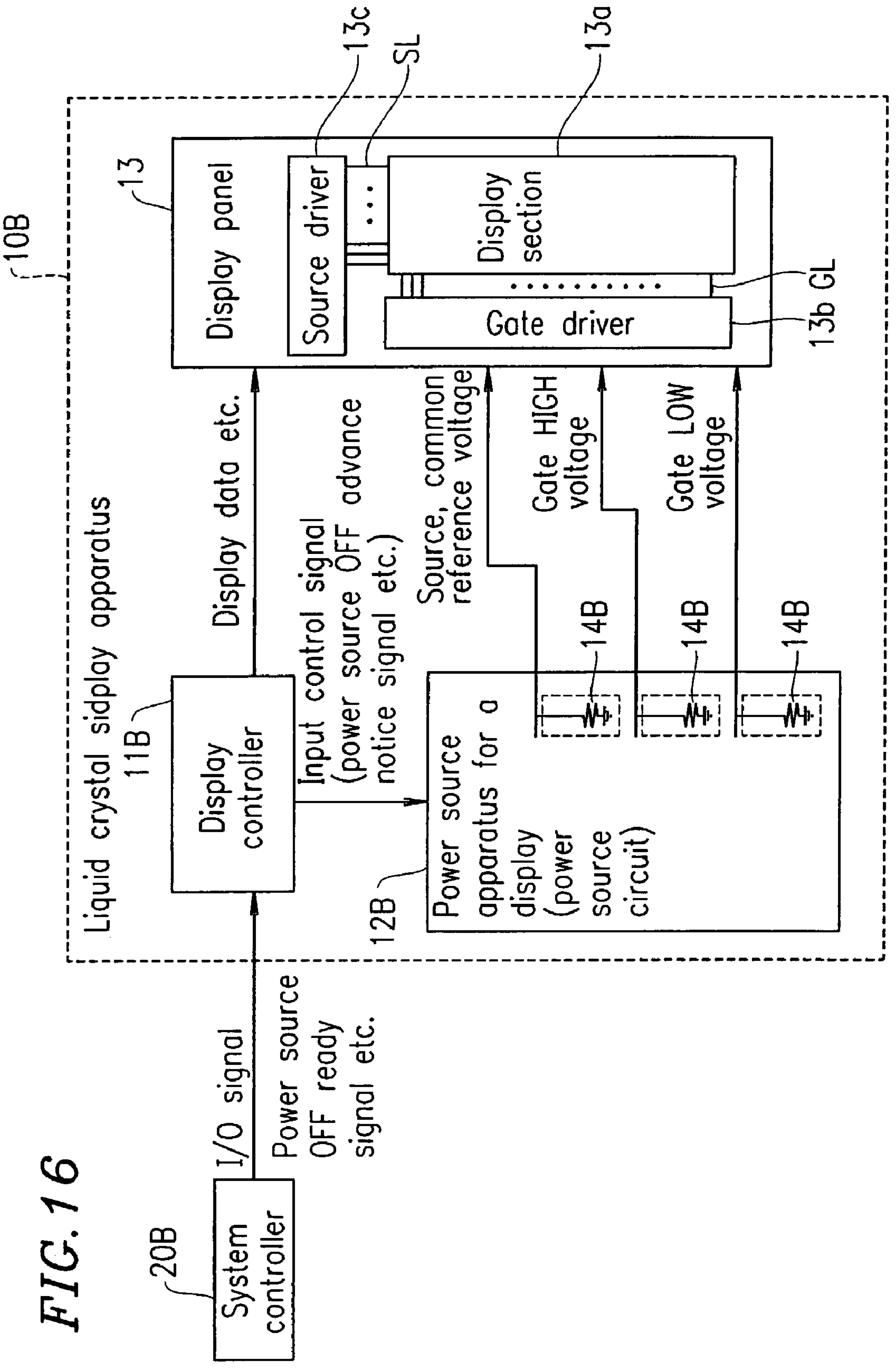
FIG. 16 is a block diagram schematically showing a configuration of a liquid crystal display apparatus according to Embodiment 3 of the present invention.

In Embodiment 3, electric charges remaining in pixels are sufficiently discharged by controlling the mask writing time period and the gate voltage HIGH time period as in Embodiment 2 so that afterimages are overcome. In addition, a resistor element (the resistor element in the Related Art section) is used instead of the FET-SW 14*a* of Embodiment 1 and 2. FIG. 16 is a block diagram schematically showing a configuration of a liquid crystal display apparatus 10B according to Embodiment 3 of the present invention. Members having substantially the same action and effect as those of FIG. 1 are referenced by the same numerals.

A display controller 11B performs mask writing by applying a pixel voltage of 0 (V) or a predetermined value to each pixel for one horizontal time period or more based on a predetermined power source OFF ready signal from the system controller 20. Thereafter, the power source supply from the power source circuit 12 to the power source display section 13*a* is terminated based on an OFF advance notice signal. In this case, the predetermined pixel voltage applied to each pixel in mask writing is a constant voltage corresponding to a normal state (normally white or normally black). As in Embodiment 2, the same voltage is applied to the source electrode (pixel electrode) and the common electrode (counter electrode) of each pixel in mask writing. Further, as in Embodiment 2, the source electrode and the common electrode are grounded after mask writing and before termination of power source supply, and a HIGH level of voltage is applied to the gate electrodes of all gate lines GL for a predetermined period of time (HIGH time period).

Thus, in Embodiment 2 and 3, as shown in FIG. 17 (with sequence in Embodiment 2 and without sequence in Embodiment 3), the electric charge removal time period (HIGH time period) is digitally controlled and arbitrarily determined, thereby making it possible to overcome residual electric charges in pixels. In this case, since the mask writing time period is provided, electric charges can be discharged uniformly throughout the screen independent of a display image immediately before the power source is turned OFF. Note that the mask writing is optimally performed with a liquid crystal applying voltage smaller than or equal to white display in the case of a normally white mode or with a liquid crystal applying voltage smaller than or equal to black display in the case of a normally black mode.

In this case, a resistor element (the resistor element in the Related Art section) is employed instead of the FET-SW 14*a* in Embodiment 1 and 2. Therefore, even if the steep fall and rise of the power source is not achieved though keeping low power consumption at a very small level as in Embodiment 1 and 2, electric charges remaining in pixels can be sufficiently discharged by controlling the gate voltage during the HIGH time period after mask writing, thereby making it possible to overcome afterimages. When the resistance of a resistor element for discharging or charging is greater than or equal to the resistance of the resistor element shown in the Related Art section, low power consumption is less hindered as compared to conventional examples.

Note that also in the case where the power source is turned OFF after mask writing, if the predetermined pixel voltage applied to each pixel in mask writing is a constant low voltage corresponding to a normal state (normally white or normally black), afterimages can be easily overcome.

According to the present invention, at least an active element (switching means) is provided between the voltage output terminal and the earth terminal such that the active element is turned ON while the voltage output is in the OFF state. As a result, afterimages and the latch-up phenomenon can be prevented from occurring after turning OFF the power source. In addition, low power consumption in driving can be achieved.

Further, if the predetermined pixel voltage applied to each pixel in mask writing is a constant low voltage corresponding to a normal state (normally white or normally black), afterimages can be easily overcome. Furthermore, by performing the HIGH time period control of the gate voltage after mask writing, electric charges remaining in pixels can be more sufficiently discharged, thereby making it possible to overcome afterimages.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A power source apparatus for a display, comprising:

a voltage generating section configured to control outputting and output termination of one or more predetermined output voltages; and a switching section provided between an output terminal of the predetermined output voltage and a predetermined reference potential terminal, wherein the switch section is turned from OFF to ON when the voltage generating section performs the output termination control and when the switching section is in one of an ON state or an OFF state, the voltage generating section is in an opposite state.

2. The power source apparatus for a display according to claim 1, wherein based on an input control signal, the voltage generating section controls the outputting or the output termination and the switching section controls ON and OFF switching.

3. The power source apparatus for a display according to claim 2, wherein a resistor element is provided between the switching section and the reference potential and/or the output terminal.

4. The power source apparatus for a display according to claim 1, wherein a resistor element is provided between the switching section and the reference potential terminal and/or the output terminal.

5. The power source apparatus for a display according to claim 1, wherein the switching section is configured to discharge electric charges held in the display.

6. A method for a display, comprising:

receiving an input signal indicating termination of an output voltage to the display;

turning a switching section from an OFF state to an ON state upon receipt of the input signal, to thereby permit efficient display discharge; and turning a voltage generating section to a state opposite the switching section wherein the voltage generating section controls termination of the output voltage to the display.

7. The method of claim 6, further comprising:

terminating output of a voltage to the display.

8. The method of claim 6, further comprising:

discharging electric charges in the display through the switching section to prevent an afterimage from occurring in the display when power to the display is terminated.

9. A power source apparatus for a display, comprising:

means for controlling outputting and termination of voltage supply to the display; and discharge means for, in response to receiving a signal indicating subsequent control of voltage termination, being activated to permit efficient discharge of the display, wherein when the means for discharging is in one of an ON state or an OFF state, the means for controlling outputting and termination of voltage supply is in an opposite state.

10. The power source of claim 9, wherein the discharge means includes a serially connected switch and resistor.

* * * * *